(12) United States Patent
Lopez-Estrada et al.

(10) Patent No.: US 7,139,470 B2
(45) Date of Patent: Nov. 21, 2006

(54) NAVIGATION FOR MPEG STREAMS

(75) Inventors: Alex A. Lopez-Estrada, Chandler, AZ (US); Jeffery S. Peel, Chandler, AZ (US); Ajit P. Joshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1151 days.

(21) Appl. No.: 09/932,806

(22) Filed: Aug. 17, 2001

(65) Prior Publication Data
US 2003/0035648 A1 Feb. 20, 2003

(51) Int. Cl.
*H04N 7/26* (2006.01)
*H04N 5/91* (2006.01)

(52) U.S. Cl. .......................... 386/109; 386/46; 386/95; 386/125

(58) Field of Classification Search ................ 386/46, 386/95, 98, 109, 111, 125; 715/716, 723, 715/731; 725/44, 46, 61, 37–39
See application file for complete search history.

(56) References Cited

U.S. PATENT DOCUMENTS

| | | | |
|---|---|---|---|
| 5,168,356 A * | 12/1992 | Acampora et al. ..... | 375/240.15 |
| 5,870,754 A | 2/1999 | Dimitrova et al. | |
| 6,118,927 A | 9/2000 | Kikuchi et al. | |
| 6,185,363 B1 | 2/2001 | Dimitrova et al. | |
| 6,192,183 B1 * | 2/2001 | Taniguchi et al. ............ | 386/52 |
| 6,236,395 B1 * | 5/2001 | Sezan et al. ................ | 715/723 |
| 6,480,669 B1 * | 11/2002 | Tsumagari et al. ............ | 386/95 |

FOREIGN PATENT DOCUMENTS

| | | |
|---|---|---|
| EP | 0810794 A2 | 12/1997 |
| GB | 2357626 A | 6/2001 |
| WO | WO 01/35669 A1 | 5/2001 |

OTHER PUBLICATIONS

Hongjiang Zhang et al: "Video Parsing and Browsing Using Compressed Data", Multimedia Tools and Applications, Kluwer Academic Publishers, Boston, US, vol. 1, 1995, pp. 89-111.
Meng J et el: "Scene Change Detection in a MPEG Compressed Video Sequence", Proceedings of the SPIE, SPIE, Bellingham, VA, US, vol. 2419, Feb. 7, 1995, pp. 14-24.
Pioneer Corporation. DVD Technical Guide. Chapter 4—"Video Format." http://www.pioneer.co.jp/crdl/tech/dvd/4-e.html. As printed on Aug. 22, 2003.
The libdvdnav Project. "An Introduction To DVD Navigation." http://dvd.sourceforge.net/dvdnav-docs/dvdnavissues.html. As printed on Aug. 22, 2003.
Search Report for PCT/US02/23084; mailed Jul. 28, 2003; 3 pages.

* cited by examiner

*Primary Examiner*—Thai Tran
*Assistant Examiner*—Mishawn Dunn
(74) *Attorney, Agent, or Firm*—Blakely, Sokoloff, Taylor & Zafman LLP

(57) ABSTRACT

Navigation information can be generated from compressed and packetized MPEG streams, and the navigation information then placed in a separate navigation file that can be accessed to permit navigation functions to be performed during decompression and playback of the MPEG stream. An authoring tool may be used to parse the MPEG stream and generate the navigation data. The navigation data may then be used to select individual start points, different audio channels, special effects, etc., during playback.

26 Claims, 6 Drawing Sheets

NAVIGATION FOR MPEG STREAMS

BACKGROUND OF THE INVENTION

1. Field of the Invention

The invention pertains generally to computers. In particular, it pertains to navigation in digitized video and/or audio data streams.

2. Description of the Related Art

Many digitized moving picture systems use the well-known protocols and formats developed by the Moving Pictures Experts Group (MPEG), so that these protocols and formats have come to be generically referred to as MPEG. Various versions have been developed, referred to as MPEG-1, MPEG-2, etc. In an MPEG system, compressed video and audio data is packetized into elementary streams wrapped inside packet headers containing information necessary to decompress the individual streams during playback. These individual audio and video elementary streams can be further assembled, or multiplexed, into a single stream with timing information in the packet headers that identifies when in a presentation the contents of each packet should be presented. In this way, video packets can be synchronized with audio packets during playback. MPEG systems use two basic types of multiplexed streams: Program Streams (PS), which are targeted primarily for storage media, and Transport Streams (TS), which are targeted primarily for transmission and the potentially higher error rate associated with data transmission.

On the encoder side of an MPEG system, audio and video are separately compressed and packetized, and a multiplexer then combines the individual packets into a PS or TS. On the decoder side, the packets are retrieved from the stream by a demultiplexer, individual packets are depacketized and decompressed, and synchronization between audio and video is achieved by using the appropriate fields in the PS or TS headers. Decoding is typically performed on the fly as the audio/video is being played back. Because the packets are time-stamped, the playback can be manipulated to perform such functions as: moving directly to specified portions of the audio and/or video presentation, pausing, playing only audio or only video, playing audio in different languages, etc., while maintaining the proper synchronization. These and similar functions are collectively referred to as navigation. Generating navigation data for an MPEG stream is conventionally done during the encoding operation, and is placed into the MPEG stream in the form of navigation packets. Generating navigation data after the MPEG stream has been created is typically very difficult, and this function is therefore unavailable to anyone that handles the MPEG stream after encoding.

DETAILED DESCRIPTION OF THE INVENTION

Various embodiments permit navigational data to be generated from an encoded MPEG stream, thus allowing creation of the navigation database to be performed after the MPEG data has been compressed, packetized, and multiplexed. The MPEG stream may consist of a data stream containing video and/or audio data that has been compressed and packetized according to various formats and protocols developed by the group that is widely but informally referred to as the Moving Pictures Expert Group (MPEG). The navigation data may be data that permits selective retrieval of portions of the MPEG stream for playback by identifying packets or other portions of the MPEG stream that are associated with navigation points, i.e., points in the presentation that the user may wish to access quickly and begin playing. Navigation data may also include data that enables special effects, such as fast forward or fast reverse.

The configuration information for a navigation database may include information on the particular points to be identified in the navigation database, and may be specified by a user. Alternately, the configuration requirements for the navigation database may be generated automatically through analyzing the contents of the MPEG stream. The navigation database may be kept separately from the MPEG stream. The data in the navigation database, which contains data about other data, may be referred to as navigation metadata.

Figure 1A:
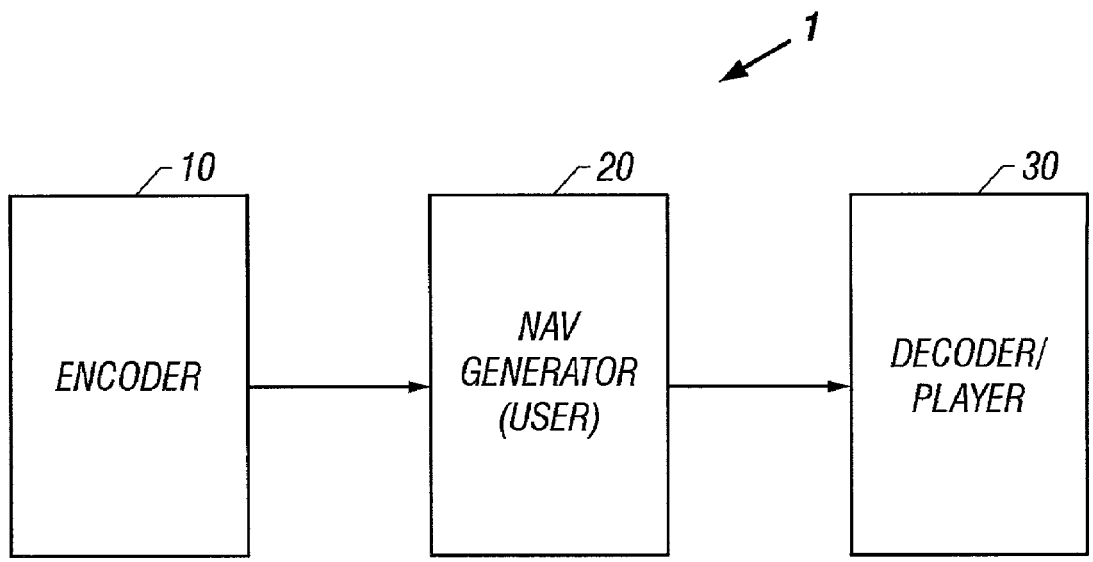
FIGS. 1A, 1B show system level block diagrams.

FIG. 1A shows a block diagram of an end-to-end system 1 that relies on user inputs to create the navigation database. Encoder 10 may receive the audio and video data, compress it to reduce the storage space and/or bandwidth required to represent that data, packetize the compressed data into audio and video packets, and multiplex the packets together into and MPEG stream. Navigation generator 20 may take inputs from a user, examine the MPEG stream from encoder 10 and produce an associated navigation database that may be used to perform navigation functions on the MPEG stream. The particular navigation functions that may be performed may be specified by the user inputs. Decoder/player 30 may select various portions of the MPEG stream for playback, based on the data in the navigation database. The selected portions may be demultiplexed, depacketized, and decompressed by decoder/player 30 to produce the desired video and/or audio outputs for playing, i.e., for viewing and/or listening and/or recording. Other functions may also be performed as result of navigation, including but not limited to pause/resume, freeze-frame, fast playback, and slow playback.

In the illustrated embodiment, the functions of decoding and playing are integrated into unit 30. In another embodiment, the decoder and player may be separate units, and the decoded data may be stored and/or transmitted for presentation by the player. In one embodiment, the functions of encoder 10, navigation generator 20, and decoder/player 30 may be performed at different times and on different platforms, so one or more storage media may be used to hold the data stream and/or navigation database until the next stage is ready to receive the data.

Figure 1B:
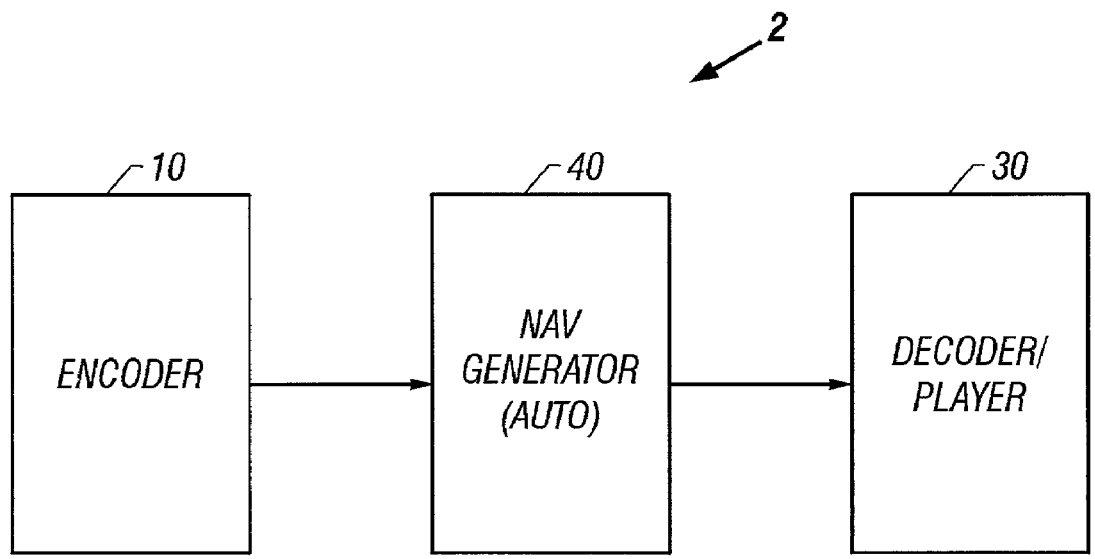

FIG. 1B shows a block diagram of an end-to-end system 2 in which the navigation database is generated automatically by monitoring the MPEG stream and identifying the desired points in the MPEG stream based on predefined criteria. Encoder 10 may perform the same functions of receiving, compressing, packetizing, and multiplexing as in system 1. Navigation generator 40 may produce a navigational database similar to that of navigation generator 20 in FIG. 1A, but may use an automated process rather than relying on direct user inputs to specify which parts of the MPEG stream will be recorded in the navigational database. Navigation generator 40 may analyze the content of the MPEG stream to generate the navigation database. Decoder/player 30 may perform the same functions as described for system 1 of FIG. 1A.

Figure 2A:
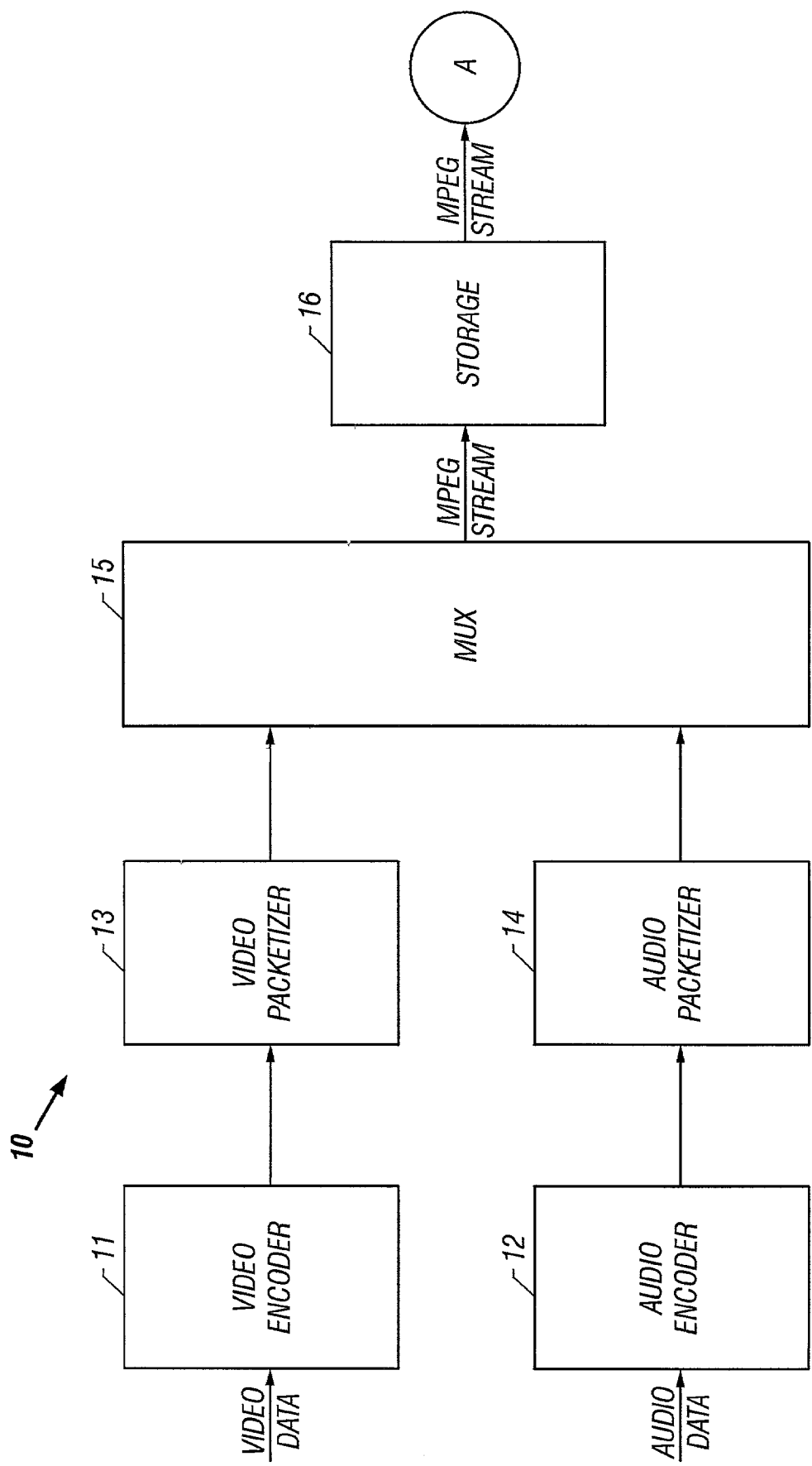
FIGS. 2A–2D show more detailed block diagrams of the components of FIGS. 1A, 1B.

FIG. 2A shows a more detailed view of the components of encoder 10. Video data and audio data may be provided separately to video encoder 11 and audio encoder 12, respectively. The video and audio signals may be digitized before presentation to encoders 11, 12. The video data may be compressed through a video compression algorithm by video encoder 11. The audio data may be compressed through an audio compression algorithm by audio encoder 12. Various video and audio compression algorithms are known in the art and are not repeated here to avoid obscuring the invention. The compressed video data from video encoder 11 may be presented to video packetizer 13, where it may be segmented into packets with predefined sizes, formats, and protocols. The compressed audio data from audio encoder 12 may be presented to audio packetizer 14, where it may be segmented into packets with predefined sizes, formats, and protocols. Each packet may contain timing information that identifies where in the playback presentation the data in the packet should be placed. By matching up timing information from various packets, the playback operation may later synchronize the video and audio packets in the proper timing relationships.

The audio data may contain multiple audio tracks, such as voice tracks in different languages for a movie, that use the same relative timing data. Each packet may also be identified by a sequence number or other identifier that will permit the navigation data to specify particular packets for playback, regardless of the associated timing information, thus permitting selection of the audio packets for the desired audio track. Other uses may also be made of the packet identifiers to permit mixing specified video and specified audio in predetermined ways during playback.

The packets produced by packetizers 13, 14 may be combined into a single data stream by multiplexer 15 and may be combined into larger data blocks. The multiplexed data may contain additional information related to timing and/or contents, and may follow the format and protocol of an MPEG transport stream.

The MPEG stream may be stored before being provided to navigation generator 20 or 40. In one embodiment, the MPEG stream is stored in storage device 16, which may be internal or external to encoder 10, and may be a portable medium such as, but not limited to, a CD-ROM or DVD disk. The data stream may be written directly into storage device 16, or may be transmitted through a transmission medium before being stored. Regardless of the particular configuration of storage device 16, the MPEG stream may be read out of it and made available at point A, which continues in FIG. 2B.

Figure 2B:
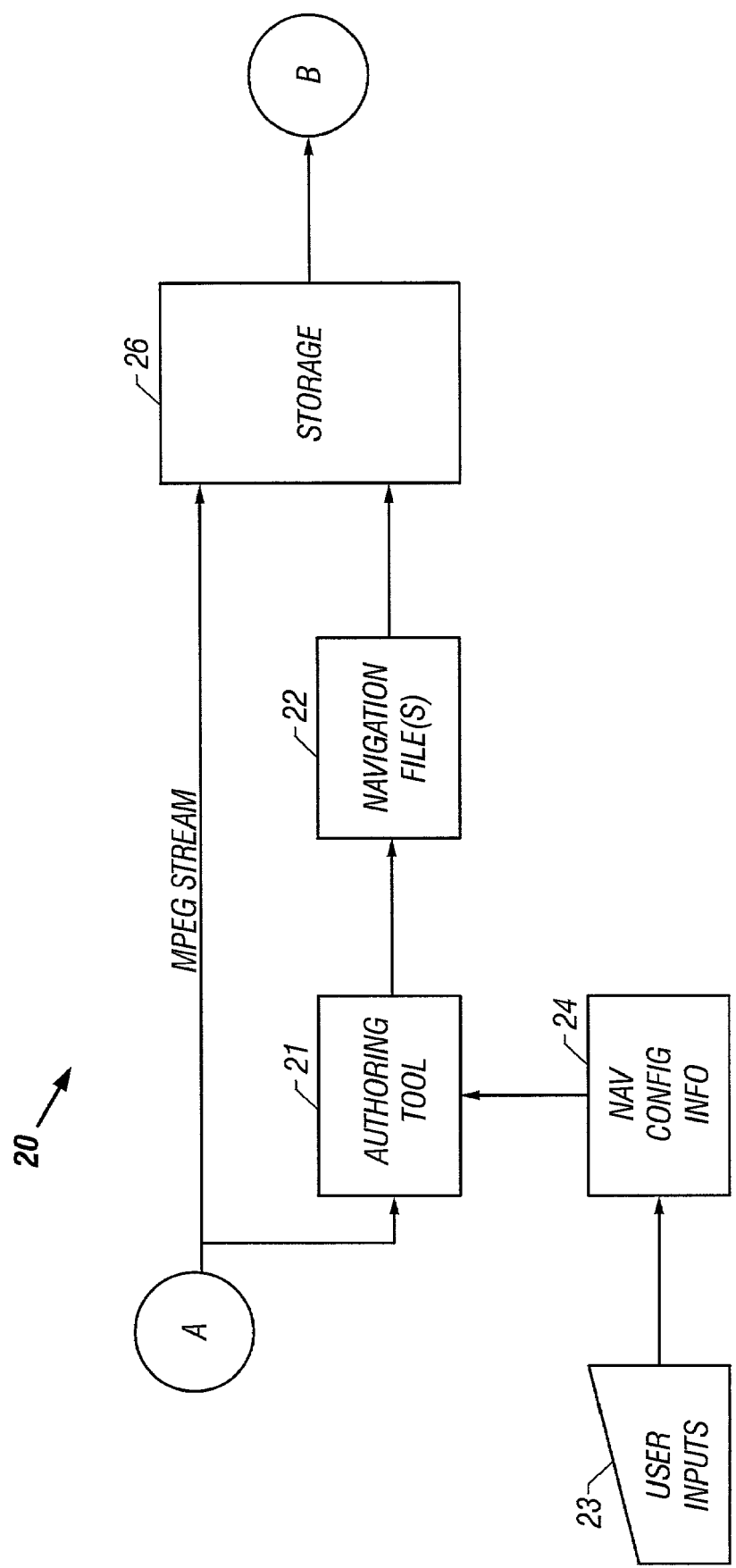

FIG. 2B shows a more detailed view of the components of navigation generator 20. Authoring tool 21 may be a functional device that examines the MPEG stream and identifies portions of it that meet specified criteria. Authoring tool 21 may take various forms, such as but not limited to a device, circuit, software or firmware module, or any combination thereof. The criteria may be provided by navigation configuration information 24, which may include a file of desired points in the MPEG stream as defined by user inputs 23. In one embodiment, a user may specify the user inputs through a keyboard or by pointing to icons on a screen with a mouse or other pointing device. Authoring tool 21 may search through the MPEG stream in various ways to locate the desired points. In one embodiment, it examines the timing information of the packets.

In one embodiment, the MPEG stream may include a digitized movie or other video sequence, and the user-inputted criteria may be points that are specified amounts of time after the movie starts, or may be points that divide the movie into a specified number of equal time segments. Authoring tool 21 may locate the video intra frame (I-frame) that is closest to each specified time, and identify that I-frame, or the packet containing that I-frame, as the requested point in the MPEG sequence. The identified times and I-frames may divide the data stream into labeled segments, such as chapters. In one embodiment, I-frames are used as reference points because, unlike predicted frames (P-frames) or bi-directional frames (B-frames), they are self-contained video images that do not depend on previous or subsequent frames for their reconstruction.

The navigation data derived by authoring tool 21 may be placed into one or more navigation files 22. Unlike conventional systems that encode navigation data into the MPEG stream, navigation file 22 may be a separate file from the file holding the MPEG stream. Both navigation file 22 and the associated MPEG stream may be stored until needed for playback. In the illustrated embodiment of FIG. 2B, both are stored in storage device 26, although they may remain as separate files. Storage 26 may be internal or external to navigation generator 20, and may be a portable medium. In one embodiment, the navigation file is actually in the form of two files. The first file may be an Extensible Markup Language (XML) file containing chapter times, positions and labels, and audio/video stream packet ID's and labels. The second file may be a binary file referred to as an I-frame index file, containing the presentation time and file offset of the packet corresponding to each video I-frame. The I-frame index file may be used for video special effects, such as fast forward and fast reverse. It may also be used as a quick-scan source for locating specific time points in the presentation. Both the navigation files and MPEG stream may be read out and made available at point B, which continues in FIG. 2C.

Figure 2C:
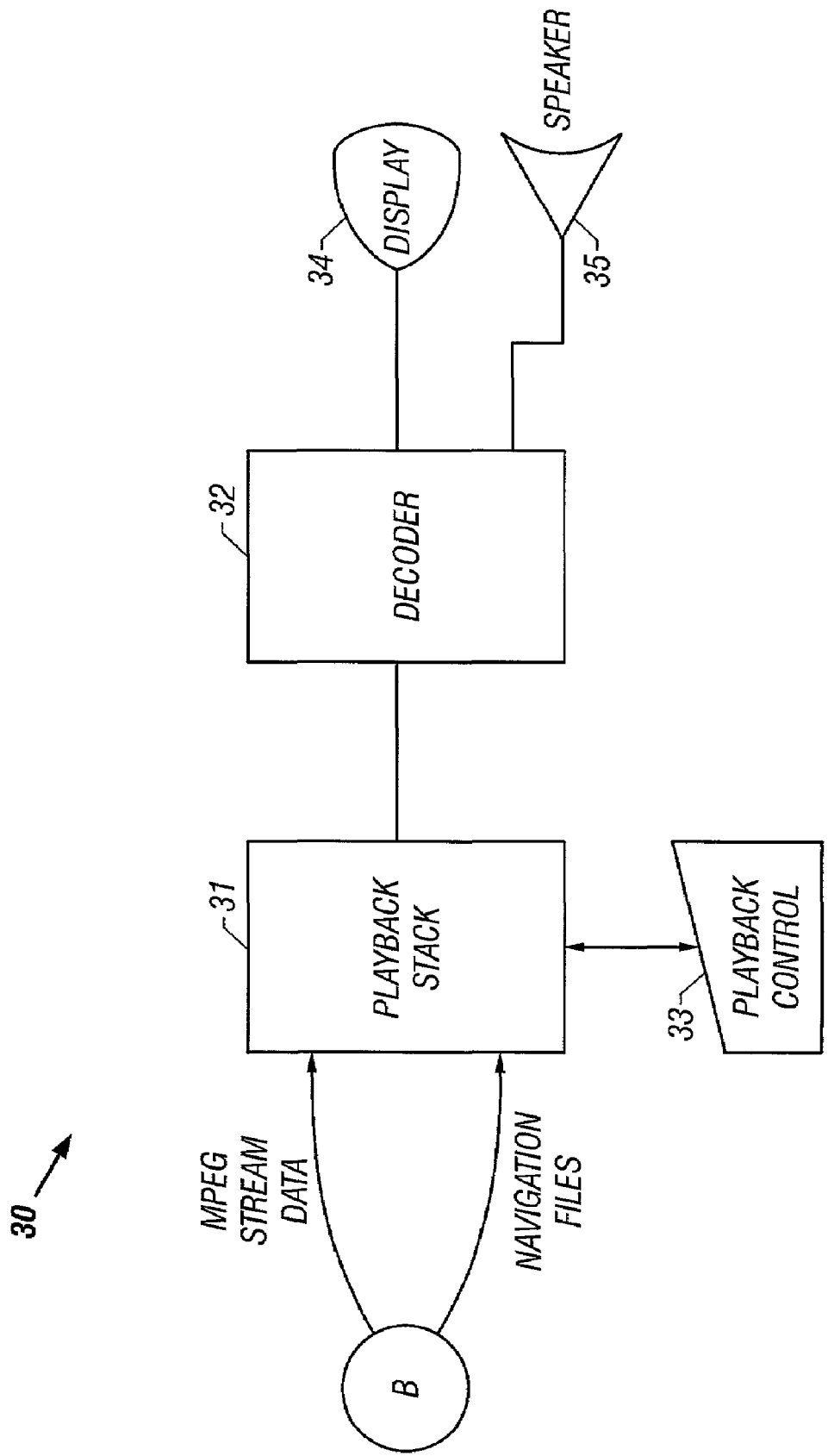

FIG. 2C shows a playback component 30 for playing all or a portion of the MPEG stream in the manner defined by navigation file 22. Playback stack 31 may read the navigation file and present navigation options to playback control 33, such as chapters available, chapter labels, etc. Playback control 33 may provide data to playback stack 31 defining which segments of the MPEG stream are to be presented. Playback stack 31 may read the navigation file indicating where in the MPEG stream various segments of the presentation are located. By combining the segment requests from playback control 33, and the navigation files identifying where in the MPEG stream/database those requested segments may be located, the selected MPEG segments may be read and presented to decoder 32, where they may be decoded and played. The illustrated embodiment shows a display 34 for presenting video, and a speaker 35 for presenting audio.

Figure 2D:
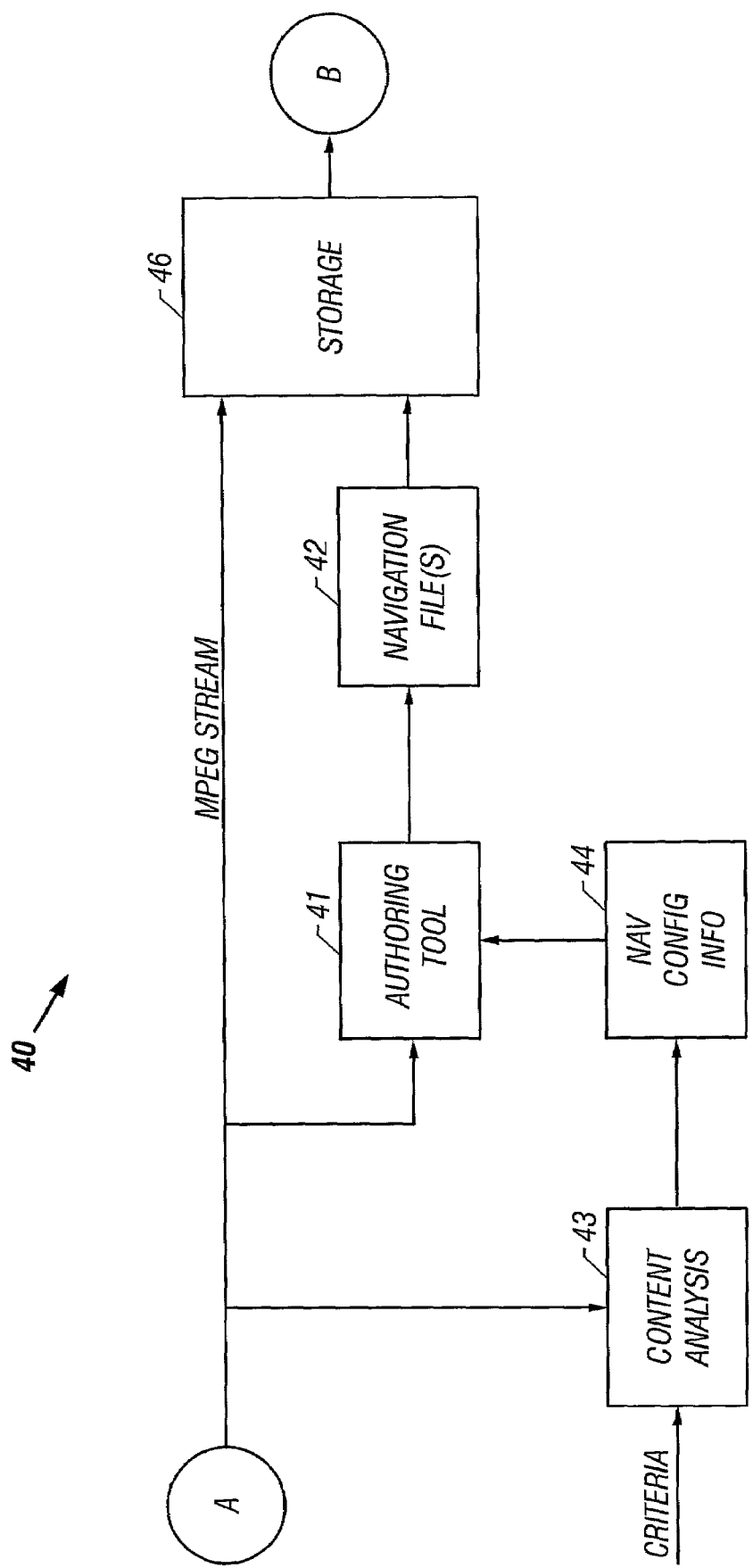

FIG. 2D shows an embodiment in which navigation information may be automatically created by navigation generator 40. Navigation generator 40 may include authoring tool 41, navigation file(s) 42, navigation configuration information 44, and storage 46, which may approximately correspond to authoring tool 21, navigation file(s) 22, navigation configuration information 24, and storage 26, respectively, of FIG. 2B. However, in navigation generator 40, content analysis module 43 may examine the video and/or audio content in the MPEG stream to determine what presentation times should be used for navigation points. In one embodiment, content analysis module 43 may use pattern recognition techniques to examine the MPEG stream and note which packets contain video and/or audio images that meet predefined criteria that have been provided to content analysis module 43. For example, content analysis module 43 may search the I-frames for the totally dark frames that occur between two scenes in a movie. The presentation time or other identification on the located frames may be passed on to navigation configuration information 44, where it may be presented to authoring tool 41. This technique may also be combined with other criteria to identify desirable breaks in the presentation. For example, if it is desirable for commercial reasons to find a natural break in a TV movie that is between 18 and 23 minutes into the presentation, the dark frames separating two scenes may be searched for between those two times in the MPEG stream, and the identification of one of those dark frames may be designated as the start of a new chapter. This may permit easy insertion of a commercial into that break.

Figure 3:
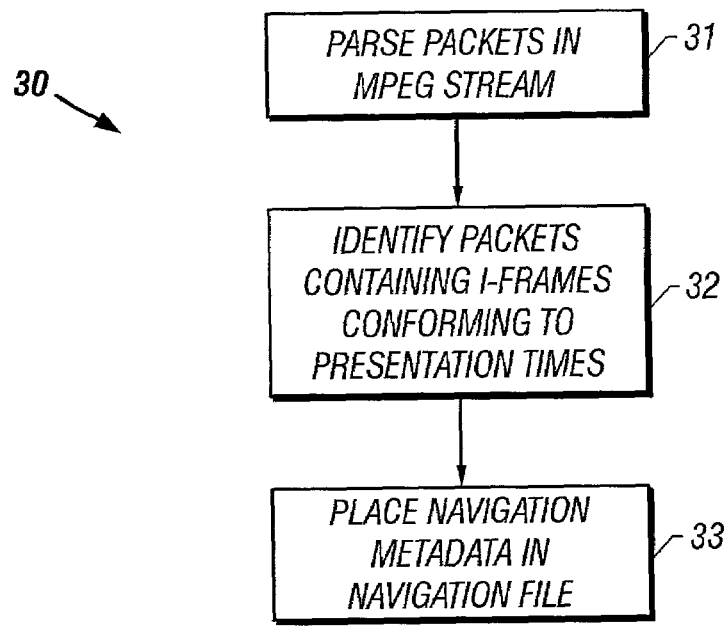
FIG. 3 shows a flow chart of a method for generating a navigation file.

FIG. 3 shows a flow chart 30 of an embodiment of a method for creating the navigation database. At block 30, an authoring tool may examine the MPEG stream by parsing through the packets in the MPEG stream. At block 32, the authoring tool may identify packets that meet a specified criteria. In the illustrated embodiment, the criteria relate to presentation times in a video sequence (for example, a point in a video presentation that is a predetermined amount of presentation time after the start), and I-frames are used as the specific indicators. The packets containing those I-frames may be the packets associated with the selected presentation times, i.e., packets containing timing information that is close to the desired presentation times. At block 33, the location information on the identified packets or I-frames may be placed into a navigation file. In one embodiment, the navigation file is separate from any file containing all or part of the MPEG stream itself, and may even be stored in a separate medium from the MPEG stream.

Figure 4:
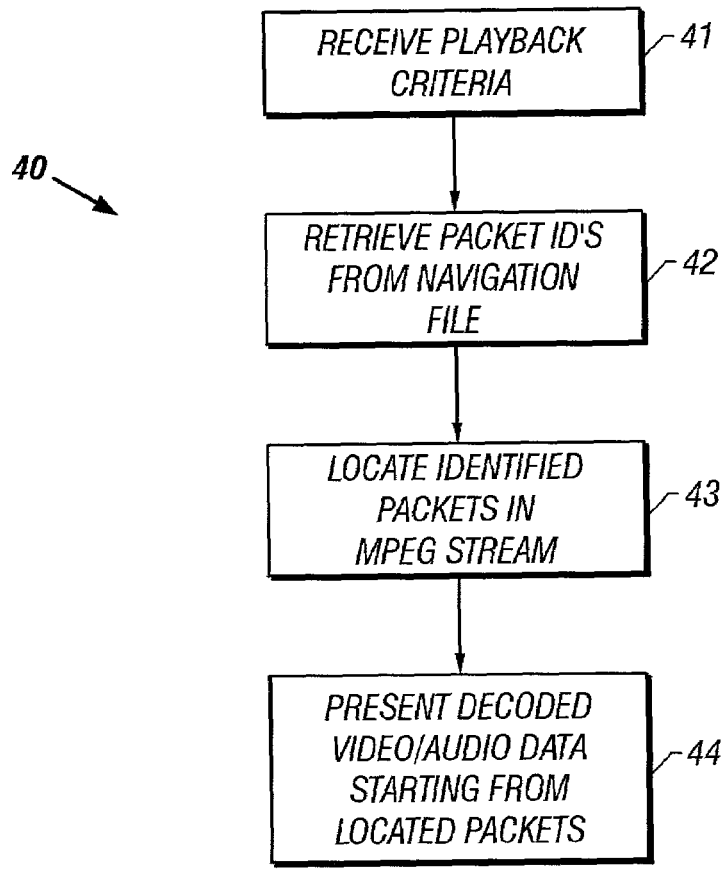
FIG. 4 shows a flow chart of a method for using a navigation file.

FIG. 4 shows a flow chart 40 of an embodiment of a method for using the navigation database for playback. At block 41, playback criteria, such as where in the presentation to start, is received. In one embodiment, this information is specified by the user. At block 42, specified packet identifiers may be retrieved from the navigation file, based on the playback criteria. For example, a user may specify he/she wishes to view chapter 3 in a movie, and the identifier of the packet associated with the start of chapter 3 may be retrieved from the navigation file. At block 43, the identified packet may be located in the MPEG stream. If the MPEG stream is recorded on an easily searchable medium, such as a compact disk (CD), an index may be used to quickly access the point on the CD containing the desired packet. At block 44, the requested packet and subsequent packets may be retrieved, decoded, and presented. In one embodiment, this may include both video and audio packets, which may be played in synchronization with each other based on the timing information contained in the packets. A stop time, with an associated packet, may also be specified to terminate the presentation sequence.

Navigation information may also be used for special effects, such as fast forward and/or fast reverse. In one embodiment, only the I-frames are retrieved and decoded for fast forward or reverse. In this embodiment, the navigation file may contain identification information for all I-frames in the video sequence, with an I-frame occurring approximately once every half second during normal-speed presentation.

Creating a navigation database may be performed at various stages by various people. For example, a company creating video disks (such as movies on DVD, video games on CD-ROM, etc.) may create a navigation file that permits the end user to navigate through the presentation in predetermined ways. That navigation file may be stored on the same video disk that contains the movie or video game. Capability may also be provided to the end user to create a custom navigation file to go directly to favorite parts in a movie, parts that are identified by the user after purchasing the video disk. This navigation file may be stored in a separate medium, such as flash memory.

The invention may be implemented in circuitry or as a method. The invention may also be implemented as instructions stored on a machine-readable medium, which may be read and executed by at least one processor to perform the functions described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
   examining an MPEG stream;
   identifying packets in the MPEG stream that are associated with navigation points in a playback of the MPEG stream;
   storing a first component of information of the identified packets in an Extensible Markup Language (XML) file; and
   storing a second component of information of the identified packets in a binary file.

2. The method of claim 1, wherein:
   examining an MPEG stream includes examining a transport stream.

3. The method of claim 1, wherein:
   the navigation database is in a separate file from the MPEG stream.

4. The method of claim 1, wherein:
   the XML file includes one or more of chapter times, positions and labels, and the binary file includes presentation time and file offset of a packet corresponding to one or more video I-frames.

5. The method of claim 1, wherein:
   identifying packets includes identifying packets associated with selected presentation times in the playback.

6. The method of claim 1, wherein:
   identifying packets includes identifying a packet containing a video I-frame with a presentation time near one of the selected presentation times.

7. A method, comprising:
   retrieving a first component of information on specified packets in an MPEG stream from an Extensible Markup Language (XML) navigation file that is separate from the MPEG stream;
   retrieving a second component of information from a binary navigation file that is separate from the MPEG stream; and
   using the retrieved information to navigate the MPEG stream.

8. The method of claim 7, wherein using the retrieved information to navigate includes:
   identifying a point in the MPEG stream identified by the retrieved information;
   processing the MPEG stream starting at the point; and
   presenting at least a portion of the processed MPEG stream.

9. The method of claim 8, wherein:
   presenting includes presenting video data.

10. The method of claim 8, wherein:
    presenting includes presenting audio data.

11. The method of claim 8, wherein:
    the XML file includes one or more of chapter times, positions and labels, and the binary file includes presentation time and file offset of a packet corresponding to one or more video I-frames.

12. A machine-readable medium having stored thereon instructions, which when executed by at least one processor cause said at least one processor to perform operations comprising:
    examining an MPEG stream;
    identifying packets in the MPEG stream that are associated with navigation points in a playback of the MPEG stream;
    storing a first component of information of the identified packets in an Extensible Markup Language (XML) file; and
    storing a second component of information of the identified packets in a binary file.

13. The medium of claim 12, wherein:
    examining an MPEG stream includes parsing packets in the MPEG stream.

14. The medium of claim 12, wherein:
    the navigation database is in a separate file from the MPEG stream.

15. The medium of claim 12, wherein:
    the navigation database is not encoded in the MPEG stream.

16. The medium of claim 12, wherein:
    identifying packets includes identifying packets associated with selected presentation times in the playback.

17. The medium of claim 12, wherein:
    identifying packets includes identifying a video I-frame with a presentation time near one of the selected presentation times.

18. An apparatus, comprising:
    a medium to provide an MPEG stream; and
    an authoring tool coupled to the medium to examine the MPEG stream and to produce a first component of navigation information stored in an Extensible Markup Language (XML) navigation file and a second component of information stored in a binary navigation file separate from the MPEG stream.

19. The apparatus of claim 18, further comprising:
    a storage device to store the navigation file.

20. The apparatus of claim 18, further comprising:
    a transmission interface to transmit the navigation file.

21. The apparatus of claim 18, wherein:
    the authoring tool includes a processor and a computer program.

22. The apparatus of claim 18, wherein:
    the navigation file includes data identifying specific points in the MPEG stream.

23. The apparatus of claim 18, further comprising:
    a playback component to navigate the MPEG stream based on contents of the navigation file.

24. A system, comprising:
    an encoder to encode digitized video and audio data into packets in an MPEG stream;
    a navigation generator coupled to the encoder to:
        examine the MPEG stream;
        generate navigation information on packets associated with specific presentation points in the MPEG stream; and
        store a first component of the navigation information in a an Extensible Markup Language (XML) navigation file and a second component of information stored in a binary navigation file separate from a file to store the MPEG stream; and
    a decoder to read and decode portions of the MPEG stream identified by the navigation information.

25. The system of claim 24, further comprising:
    a player to present the decoded portions of the MPEG stream.

26. The system of claim 24, wherein:
    the MPEG stream includes timing information for synchronized presentation of the video and audio data.

* * * * *